June 24, 1969  T. J. WEBSTER  3,451,196
GAS PURIFICATION
Filed July 26, 1966
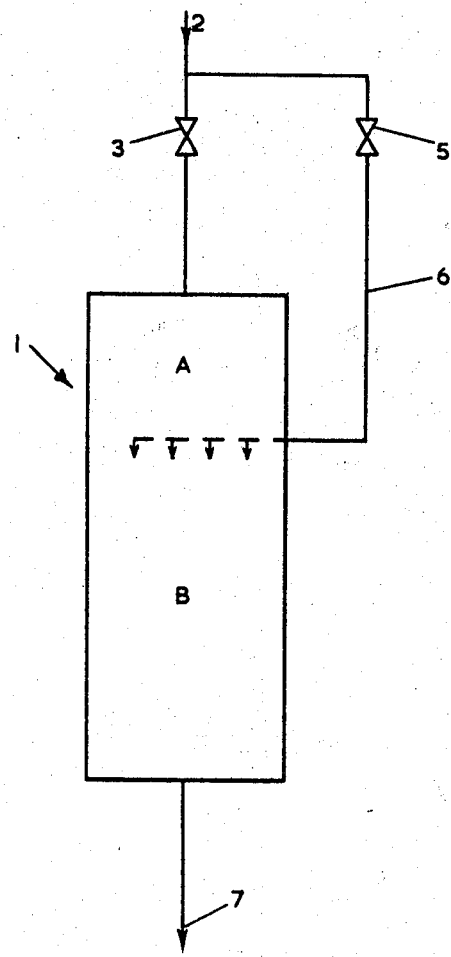
INVENTOR
THOMAS JOHN WEBSTER
BY Townshend & Mesule
ATTORNEYS 3,451,196
GAS PURIFICATION
Thomas J. Webster, Ashford, Middlesex, England, assignor to The British Oxygen Company Limited, a British company
Filed July 26, 1966, Ser. No. 567,937
Claims priority, application Great Britain, Aug. 24, 1965, 36,366/65
Int. Cl. B01j 1/22; B01d 53/04
U.S. Cl. 55—74          6 Claims

ABSTRACT OF THE DISCLOSURE

Gas purification apparatus comprises an adsorber unit having a first inlet at one end and an outlet at the other end, and provided with a second inlet intermediate the ends of the unit. A bypass line connects the first inlet to the second inlet and valve means is provided to direct the gas either into the first inlet or through the bypass line into the second inlet. Gas is fed into the adsorbent bed from the inlet to the outlet, thereby establishing a concentration of retained impurity which progressively increases from the inlet to the outlet. When the impurity content of the effluent gas attains an acceptable low level the gas is directed, by way of the valve means, into the second inlet so as to bypass that part of the bed wherein the bulk of the impurities are retained.

---

This invention relates to processes for removing impurities by adsorption from a gas stream flowing in a substantially closed circuit system. Particular examples of such impurities are atmospheric gases in helium used as the working fluid of a refrigerator (a so-called "helium refrigerator"). In such a system, helium is liquefied and the liquid helium is passed into the refrigerator, being vaporised and adsorbing heat; the gaseous helium is then reliquefied, and the process continues indefinitely.

A gas purification or adsorption system in such a closed circuit system has a two-fold duty. Firstly, because complete initial removal of the atmospheric impurity by normal purging methods is usually impracticable, the relatively high concentration of impurities present at the start must be reduced. Secondly, after the first few passes of the helium, the impurities must be held at an acceptable low level throughout the remainder of the running time despite continuous inleak of impurities. Such closed circuit systems are designed and built so that the impurity inleak in one pass of process gas does not raise the concentration of impurities above an acceptable level; however, if no action were taken to remove the impurities the acceptable level would eventually be exceeded.

The adsorption process is by nature an equilibrium process and the adsorptive capacity of the adsorbent under the given temperature and pressure conditions depends on the impurity concentration. Thus during the initial stages, when there is a relatively high concentration of impurities in the gas and a relatively low concentration in the adsorbent, the specific adsorption of impurities from the gas to the adsorbent is high. As adsorption proceeds, however, the impurities absorbed at high concentration tend to be released from the adsorbent by the subsequent passes of helium having a relatively low impurity content. With known arrangements using a single bed of adsorbent, these subsequent passes of low impurity helium cause the initial high impurity concentration in the adsorbent to move through the bed in the form of a "concentration plug," which consists of a layer of adsorbent having a high impurity content. As the concentration plug approaches the outlet end of the bed the adsorbent at this outlet end becomes heavily charged wih the impurity and thus the impurity content of the outgoing gas rises rapidly. This is referred to as the "breakthrough" point. At this stage the adsorbent normally requires regeneration to remove the impurities. The main object of our invention is to provide a process in which regeneration is required less frequently than with this known process.

According to the present invention, a process for purifying a gas stream circulating in a substantially closed system comprises a first stage of passing the gas successively through first and second adsorbent beds while the impurity level is high, and a second stage of passing the gas through the second bed alone when the impurity level has been reduced. The changeover from the first to the second stage is not critical, but preferably should occur when the impurity level of gas entering the first bed has been reduced to a value which can be ascribed to the continuous inleak of impurities into the system or their formation therein.

The effect of this process is to retain the concentration plug of impurities, caused by the initial high impurity level, within the first bed. In the second stage the low impurity level can be effectively dealt with by the second bed, which does not have to deal with impurities desorbed from the first bed.

The invention further provides apparatus for use with the process of the invention, which may either comprise two adsorbent beds with a bypass line across the first, or a single unit having a bypass line across a portion of the unit constituting the first bed and providing the inlet into the remainder portion constituting the second bed.

The invention will be more particularly described with reference to the accompanying drawing showing an adsorber arrangement suitable for use in a helium refrigerator in which a constant amount of helium is recirculated around the system.

The drawing shows an adsorber 1 connected between inlet and outlet lines 2 and 7 respectively. The adsorber 1 is effectively divided into first and second beds A and B by provision of a second inlet line 6 which bypasses the first bed A and which leads into a header at the inlet end of the second bed B. Valves 3 and 5 are provided whereby incoming gas can be caused to flow either successively through beds A and B, or through the bed B only.

In operation, initial purification of helium having a high level of impurities is effected by passing the helium through line 2, valve 3, beds A and B in succession, and out through line 7. While this stage is proceeding a high level of impurities accumulates at the top of the adsorber and begins to move down as the gas becomes more purified. When it is found that the gas entering the system contains only an impurity level which corresponds to continuous inleak into the system, valve 3 is closed and the valve 5 is opened, allowing the second stage of purification to be established. In this stage, the gas in passing through bed B bypasses the plug of imprituies absorbed in bed A, and prevents these impurities from being desorbed by the gas. In this second stage therefore bed A is inoperative but bed B is sufficient to protect the system from any buildup of impurities due to inleak.

The apparatus may be designed with the beds so proportioned that the impurity level in the gas fed into the top of bed B via line 6 has an impurity concentration in equilibrium with that of the adsorbent at this point; in this way the bed B may be of maximum size without risk of carryover from bed A. To use such apparatus with maximum efficiency, the changeover should be operated according to the impurity level of the incoming gas. In most cases however it is not possible to operate the changeover in this way (for example when impurity concentrations are not accurately known), and in such cases the changeover is operated when a predetermined time interval has elapsed after start up.

The apparatus of this invention involves a very simple modification of the usual adsorber system, essentially merely the addition of a bypass and valve. If desired the valves can be arranged to change over automatically either on a time basis or in response to an impurity sensing device.

The same process may be carried out using two separate adsorbent beds connected together in series and with a bypass line connecting the inlet of the first bed to the inlet of the second bed. A valve arrangement similar to that described above would be used, with one valve in the bypass line and a second valve in the inlet of the first bed downstream of the connection with the bypass line.

I claim:

1. A process for purifying a gas stream circulating in a substantially closed system in which the gas initially contains a relatively high concentration of impurities and in which further impurities leak in at a relatively low rate which comprises passing the gas through an adsorbent bed from an inlet to an outlet to establish therein a concentration of retained impurity which progressively decreases in the direction of flow of the gas through the bed, continuing passing the gas in the same direction of flow through the bed until the impurity content of the effluent gas attains an acceptable low level and then bypassing that part of the bed wherein the bulk of the impurities is retained.

2. A process as claimed in claim 1, in which the bypassing is affected when the impurity level of the incoming gas corresponds approximately to that which can be ascribed to the continuous inleak of impurities into the system or their formation therein.

3. A process as claimed in claim 1, in which the bypass is effected when a predetermined time interval has elapsed after startup.

4. A process as claimed in claim 1 in which the adsorbent bed is contained in a single vessel provided with a valve which allows the gas to bypass a part of the bed.

5. Gas purification apparatus for use with a substantially closed system in which the gas is circulated, comprising a fixed adsorption bed having at one end a first inlet and at the other end an outlet and having a second inlet intermediate the ends thereof, a bypass line connecting the said first inlet to the said second inlet, and valve means operative to direct the gas either into the first inlet or through he bypass line and into the second inlet.

Gas purification apparatus as claimed in claim 5, in which the valve means comprises a first valve located in the first inlet to the adsorption bed downstream of the connection thereto of the bypass line.

References Cited

UNITED STATES PATENTS

| 3,225,517 | 12/1965 | Wachsmuth | 55—31 |
| 3,233,418 | 2/1966 | Shaievitz | 62—40 |
| 3,279,153 | 10/1966 | Basmadjian | 55—66 |

REUBEN FRIEDMAN, *Primary Examiner.*
CHARLES N. HART, *Assistant Examiner.*

U.S. Cl. X.R.

55—387